United States Patent
Nory et al.

(10) Patent No.: US 9,832,713 B2
(45) Date of Patent: Nov. 28, 2017

(54) METHODS AND DEVICES FOR CELL DISCOVERY

(71) Applicant: Google Technology Holdings LLC, Mountain View, CA (US)

(72) Inventors: Ravikiran Nory, Buffalo Grove, IL (US); Sandeep H. Krishnamurthy, Mountain View, CA (US); Ravi Kuchibhotla, Gurnee, IL (US); Robert T. Love, Barrington, IL (US); Vijay Nangia, Algonquin, IL (US); Ajit Nimbalker, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/424,126

(22) Filed: Feb. 3, 2017

(65) Prior Publication Data

US 2017/0150428 A1    May 25, 2017

Related U.S. Application Data

(62) Division of application No. 14/243,080, filed on Apr. 2, 2014.

(Continued)

(51) Int. Cl.
*H04W 48/16* (2009.01)
*H04W 48/10* (2009.01)

(52) U.S. Cl.
CPC .......... *H04W 48/16* (2013.01); *H04W 48/10* (2013.01)

(58) Field of Classification Search
CPC .............................. H04W 48/16; H04W 48/10
See application file for complete search history.

(56) References Cited

U.S. PATENT DOCUMENTS

| 8,311,545 B2 | 11/2012 | Zhu |
| 2006/0281456 A1 | 12/2006 | Roberts et al. |

(Continued)

FOREIGN PATENT DOCUMENTS

| WO | 2009043216 A1 | 4/2009 |
| WO | 2010110706 A1 | 9/2010 |

(Continued)

OTHER PUBLICATIONS

Mediatek Inc., Methods for Efficient Discovery of Small Cells, 3GPP TSG-RAN WG1 #72, Draft R1-130225 V3, Jan. 28, 2013, St. Julian's, Malta (4 pages).

(Continued)

*Primary Examiner* — Nathan Mitchell
(74) *Attorney, Agent, or Firm* — Faegre Baker Daniels LLP

(57) ABSTRACT

This disclosure sets forth methods and devices for communication between mobile devices and base stations with active and dormant states. In an embodiment, a base station transmits system information during an active state of the base station with at least one system-information message. The at least one system-information message includes a SystemInformationBlockType1 ("SIB1") message with a first update-indicator field. The base station selects an update value that indicates whether the system information has changed since a previous transmission of a previous SIB1 message. The base station transmits at least one dormant-state message during a dormant state of the base station with the selected update value in a second update-indicator field of the at least one dormant-state message.

6 Claims, 10 Drawing Sheets

Related U.S. Application Data

(60) Provisional application No. 61/807,836, filed on Apr. 3, 2013, provisional application No. 61/807,832, filed on Apr. 3, 2013.

(56) References Cited

U.S. PATENT DOCUMENTS

| | | | |
|---|---|---|---|
| 2007/0291770 A1* | 12/2007 | Kitazoe | H04J 11/0093 370/395.52 |
| 2008/0076419 A1 | 3/2008 | Khetawat | |
| 2009/0080407 A1* | 3/2009 | Onggosanusi | H04L 5/0007 370/350 |
| 2009/0132674 A1 | 5/2009 | Horn | |
| 2009/0132675 A1 | 5/2009 | Horn | |
| 2009/0196197 A1 | 8/2009 | DiGirolamo et al. | |
| 2009/0232125 A1* | 9/2009 | Kim | H04J 11/0093 370/350 |
| 2010/0099409 A1* | 4/2010 | Han | H04B 1/70735 455/434 |
| 2010/0165882 A1 | 7/2010 | Palanki | |
| 2010/0272037 A1 | 10/2010 | Lee et al. | |
| 2011/0117912 A1 | 5/2011 | Mahajan et al. | |
| 2011/0149878 A1 | 6/2011 | Ahmadi | |
| 2011/0207465 A1 | 8/2011 | Dwyer et al. | |
| 2012/0015657 A1 | 1/2012 | Comsa et al. | |
| 2012/0071160 A1 | 3/2012 | Das | |
| 2012/0093021 A1 | 4/2012 | Kim et al. | |
| 2012/0113846 A1 | 5/2012 | Narasimha et al. | |
| 2012/0163305 A1 | 6/2012 | Nimbalker et al. | |
| 2012/0176985 A1 | 7/2012 | Cha et al. | |
| 2012/0309394 A1 | 12/2012 | Radulescu | |
| 2013/0053091 A1 | 2/2013 | Jorguseski et al. | |
| 2014/0038597 A1 | 2/2014 | Wang | |
| 2014/0078912 A1* | 3/2014 | Park | H04L 5/0048 370/252 |
| 2014/0169324 A1* | 6/2014 | Seo | H04L 5/001 370/329 |
| 2014/0254567 A1* | 9/2014 | Han | H04W 56/00 370/336 |
| 2015/0029858 A1 | 1/2015 | Xu et al. | |
| 2015/0049649 A1 | 2/2015 | Zhu | |
| 2015/0140993 A1 | 5/2015 | Horn | |
| 2015/0223073 A1* | 8/2015 | Peng | H04W 8/26 455/446 |
| 2015/0305005 A1* | 10/2015 | Webb | H04L 5/0048 370/336 |
| 2015/0305075 A1* | 10/2015 | Fodor | H04W 8/005 370/329 |
| 2015/0373628 A1* | 12/2015 | Hwang | H04W 48/16 370/338 |
| 2016/0088579 A1* | 3/2016 | Harada | H04W 48/10 370/336 |

FOREIGN PATENT DOCUMENTS

| | | |
|---|---|---|
| WO | 2012092066 A1 | 7/2012 |
| WO | 2013005175 A1 | 1/2013 |

OTHER PUBLICATIONS

Nokia Seimens Networks, Additional Update Due to Normal SIB Modification, 3GPP TSG-RAN WG2 Meeting #79, Draft R2-123678, Aug. 13, 2012, Qingdao, China (17 pages).

Samsung, Evaluation Assumptions for Discovery of Small Cells, 3GPP TSG-RAN WG1 #72, Draft R1-130300, Jan. 28, 2013, St. Julian's, Malta (3 pages).

3rd Generation Partnership Project, Technical Specification Group Radio Access Network, Evolved Universal Terrestrial Radio Access (E-UTRA), Radio Resource Control (RRC), Protocol Specification, Release 11; 3GPP TS 36.331, V11.3.0 (Mar. 2013) (84 pages).

European Patent Office, International Search Report and Written Opinion for PCT Application No. PCT/US2014/032708, dated Oct. 9, 2014 (19 pages).

European Patent Office, International Search Report and Written Opinion for PCT Appln. No. PCT/US2014/032698, dated Aug. 13, 2014 (13 pages).

Nokia Seimens Networks et al.: "On New Carrier Type and Backwards Compatibility", 3GPP TSG-RAN WG1 Meeting #72, R1-130481, St. Julian's, Malta, Jan. 28-Feb. 1, 2013, all pages.

Qualcomm Incorporated: "Design aspects of NCT", 3GPP TSG-RAN WG1 #71, R1-125118, Nov. 12-16, 2012, New Orleans, LA, U.S.A., all pages.

NTT Docomo: "Overview of Mobility Enhancement for Small Cell Enhancement", 3GPP TSG RAN WG1 Meeting #72, R1-130405, St. Julian's, Malta, Jan. 28-Feb. 1, 2013, all pages.

NTT Docomo: "Enhanced Cell Identification for Additional Carrier Type", 3GPP TSG RAN WG1 Meeting #68 R1-120398, Dresden, Germany, Feb. 6-10, 2012, all pages.

Intel Corporation: "Discussion on small cell discovery operation", 3GPP TSG-RAN WG1 #72, R1-130088, St. Julian's, Malta, Jan. 28-Feb. 1, 2013, all pages.

3GPP TR 36.839V 1.1.0 (Dec. 2012, 3rd Generation Partnership Project; Technical Specification Group Radio Access Network; Evolved Universal Terrestrial Radio Access (E-UTRA); Mobility enhancements in heterogeneous networks (Release 11), Section 6, all pages.

U.S.; Non-Final Office Action; U.S. Appl. No. 14/243,080; dated Oct. 20, 2015.

U.S.; Non-Final Office Action; U.S. Appl. No. 14/243,069; dated Sep. 23, 2015.

* cited by examiner

METHODS AND DEVICES FOR CELL DISCOVERY

CROSS-REFERENCE TO RELATED APPLICATIONS

This application is a divisional application of U.S. patent application Ser. No. 14/243,080, filed Apr. 2, 2014 which claims priority to U.S. Provisional Patent Applications 61/807,832, filed Apr. 3, 2013, and 61/807,836, filed Apr. 3, 2013, the contents of which are incorporated herein by reference in their entireties. This application is related to U.S. patent application Ser. No. 14/243,069, filed Apr. 2, 2014.

TECHNICAL FIELD

The present disclosure is related generally to wireless network communications and, more particularly, to communication between mobile devices and base stations with active and dormant states.

BACKGROUND

Mobile devices for wireless networks scan for signals and channels in order to synchronize with the wireless network. Where the wireless network is a Long-Term Evolution ("LTE") network, an evolved Node B ("eNB") is a base station that broadcasts primary synchronization signals ("PSS") and secondary synchronization signals ("SSS") as cell-identification signals in each system frame. The eNB also periodically transmits other general signals that are not specific to a mobile device, such as common reference signals, and network configuration data, such as a master information block and system information blocks. The eNB consumes power to transmit the general signals and network configuration data even when there are no mobile devices with an active connection. In some cases, the eNB is configured for a reduced activity state or dormant state. At least while mobile devices are connected to the eNB, the eNB must provide a notification to the mobile devices when the network configuration data have changed.

The eNB must also periodically transmit a cell-identification signal so that other mobile devices can detect the eNB, for example, for a handover between eNBs or when a user turns on his mobile device. Cell-identification signals such as the PSS and SSS are susceptible to "pilot pollution" and "pilot collision" when cells are very close to each other. For example, a wireless network operator can place several small cells in an area where he wishes to offload data from a macro cell. In this case, the cell-identification signals from each small cell can cause interference with other small cells which are in close proximity.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
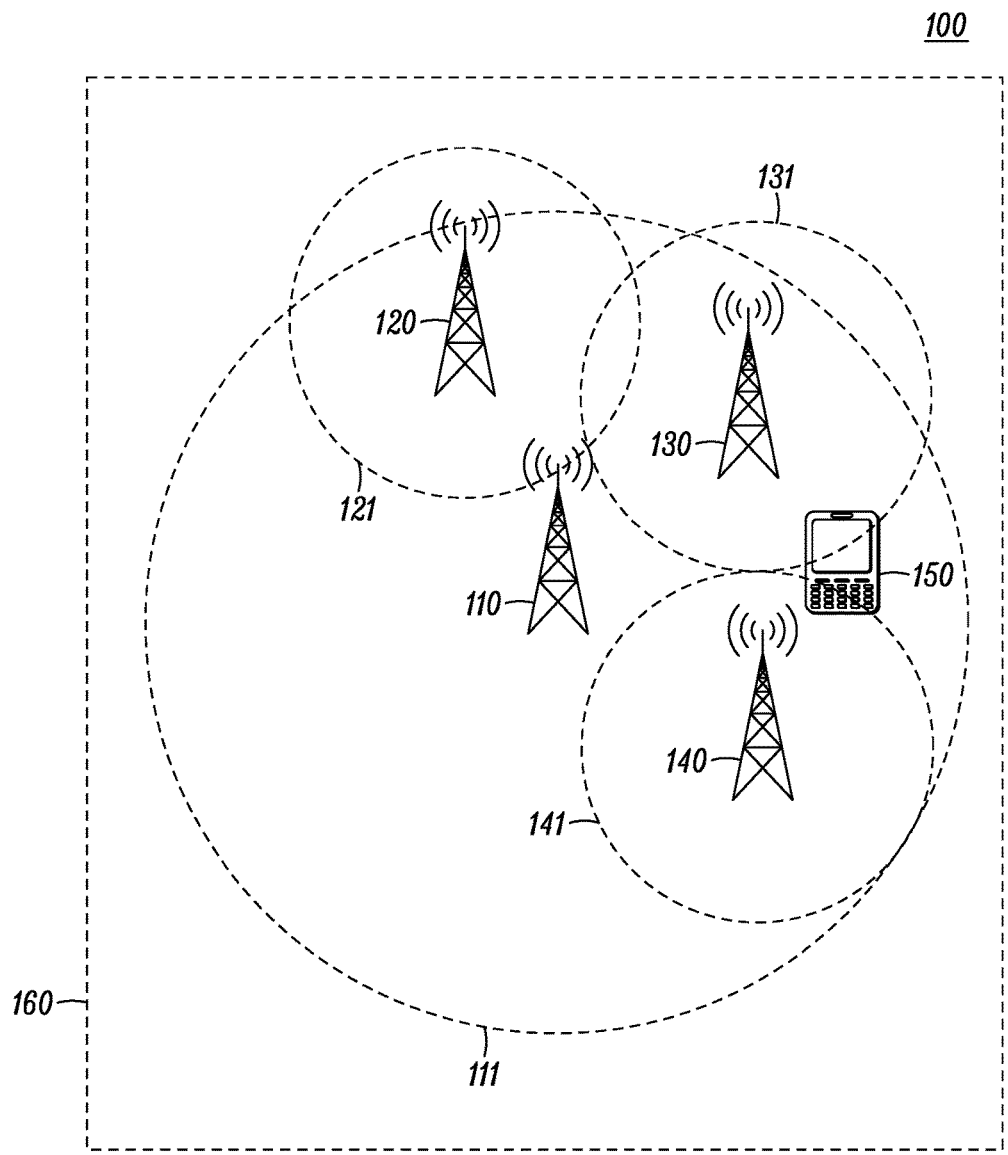
FIG. 1 is an overview of a representative communication system in which the methods of this disclosure may be practiced.

Turning to the drawings wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The various embodiments described herein allow a base station or cell (e.g., a small cell) to indicate changes in system information during a dormant state of the base station or cell. This technique helps to reduce signaling overhead between a cell and mobile devices that discover or are served by the cell. In other embodiments, the base station transmits a cell-discovery signal that allows a mobile device to determine whether the base station is in an active or dormant state. This technique allows a mobile device to select radio resources based on the state of the base station. In still other embodiments, the base station selects a cell-discovery signal that indicates a small-cell identifier selected from a set of allowable values that is larger than a number of available physical-cell identifiers. This technique reduces interference between discovery signals of adjacent small cells.

According to an embodiment of the disclosure, a base station transmits system information with at least one system-information message ("SI message") during an active state of the base station. The SI message includes a SystemInformationBlockType1 ("SIB1") message with a first update-indicator field. The base station selects an update value that indicates whether the system information has changed since a previous transmission of a previous SIM message. The base station transmits, during a dormant state of the base station, at least one dormant-state message with the selected update value in a second update-indicator field of the at least one dormant-state message.

Turning to FIG. 1, a block diagram 100 illustrates base stations 110, 120, 130, and 140 and a mobile device 150. The base stations 110, 120, 130, and 140 form at least part of a wireless network 160. In one embodiment, the wireless network 160 is a cellular (e.g., LTE) network. In the embodiment shown, the base station 110 controls a macro cell 111 and the base stations 120, 130, and 140 control small cells 121, 131, and 141, respectively. The small cells 121, 131, and 141 are associated with the macro cell 111, for example, the base stations 120, 130, and 140 are controlled by the base station 110. Examples of small cells include femtocells, picocells, and microcells. The mobile device 150 communicates with the wireless network 160 via the base stations 110, 120, 130, or 140. Possible implementations of the mobile device 150 include a mobile phone (e.g., smartphone), a tablet computer, a laptop, or other accessory or computing device.

Figure 2:
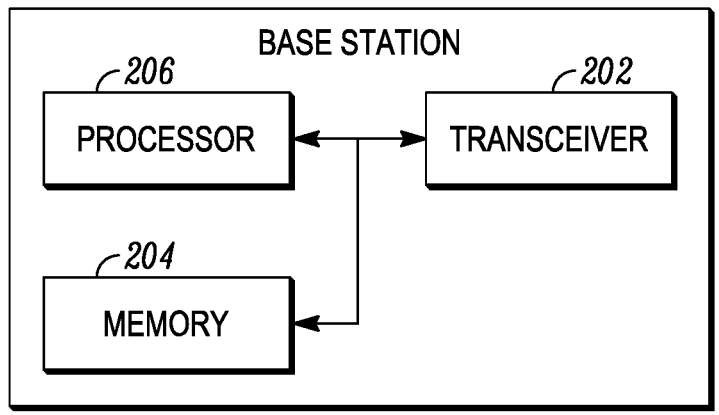
FIG. 2 is a block diagram of a base station of the system of FIG. 1, according to an embodiment.

Turning to FIG. 2, a block diagram 200 illustrates an embodiment of a base station such as the base stations 110, 120, 130, and 140 of FIG. 1. Possible implementations of the base station include an Evolved Universal Terrestrial Radio Access base station, an eNB, a transmission point, a Remote Radio Head, a home eNB, or a femtocell. In one example, the base station is an eNB that controls a macrocell of the wireless network 160. In another example, the base station controls a small cell of the wireless network 160. In yet another example, the base station controls a macro cell and one or more small cells of the wireless network 160. The base station in other examples includes multiple network entities. For example, the base station can in fact be two or more base stations operating in conjunction with one another to operate as a single base station or network entity. The base station in one example is a portion of another network entity.

The base station includes a transceiver 202, which is configured to transmit data to and receive data from other devices such as the mobile device 150. The base station also transmits or broadcasts signals or data within the corresponding cell. For example, the base station 110 transmits signals within the macro cell 111, and the base station 120 transmits signals within the small cell 121. The base station also includes at least one memory 204 and a processor 206 that executes programs stored in the memory 204. The processor 206 writes data to and reads data from the memory 204. During operation, the transceiver 202 receives data from the processor 206 and transmits Radio Frequency ("RF") signals representing the data. Similarly, the transceiver 202 receives RF signals, converts the RF signals into appropriately formatted data, and provides the data to the processor 206. The processor 206 retrieves instructions from the memory 204 and, based on those instructions, provides outgoing data to, or receives incoming data from, the transceiver 202.

The base station transmits signals and data for synchronization of mobile devices with the wireless network 160. In an embodiment, the wireless network 160 is an LTE network or LTE-Advanced network. In a typical LTE network, the base station transmits cell-identification signals in each system frame, such as PSS and SSS. The base station also periodically transmits other general signals (i.e., signals not specific to a mobile device), such as common reference signals, and data, such as a master information block transmitted over a physical broadcast channel ("PBCH"), SIBs transmitted over a physical downlink shared channel ("PDSCH"), and others as will be apparent to those skilled in the art. A mobile device discovers a cell and determines the physical-cell identifier for the cell based on the PSS and SSS. The cell consumes more power when transmitting PSS and SSS during an active state. The PSS and SSS are also susceptible to "pilot pollution" and "pilot collision" when cells are very close to each other (e.g., for the small cells 121, 131, 141).

The base station operates in multiple states, such as one or more of an active state, dormant state, or semi-dormant state. In general, in the dormant state, the periodicity of periodic non-mobile device-specific transmissions (e.g., synchronization signals, transmissions related to system information) from the base station is longer (e.g., "1 ms every 100 ms" or "5 ms every 1 second") when compared to the periodicity of such transmissions in the active state (e.g., "1 ms every 5 ms" or "multiple symbols in every 1 ms subframe"). Enabling a base station to operate in a dormant state not only helps in reducing energy consumption of the base station but also helps in reducing overall network interference.

In some embodiments disclosed herein, the base station uses a cell-discovery signal or small cell-discovery signal ("SCDS"), in addition to the PSS and SSS, for synchronization of mobile devices with the wireless network 160. The SCDS in one example allows a mobile device to determine a cell identifier (e.g., a small-cell identifier), a downlink cyclic prefix length, half-frame timing, and slot index. Where the PSS, SSS, and SCDS are used within a same frame, the base station transmits the PSS, SSS, and SCDS using non-overlapping radio resources (e.g., resource elements or resource blocks ("RBs")). The base station in one example selects the radio resources for the SCDS such that the SCDS is detectable by a mobile device within a single measurement-gap instance (i.e., 6 ms for LTE). In a further example, the base station transmits the SCDS using radio resources that do not overlap with radio resources for a physical control format indicator channel ("PCFICH"), a physical downlink control channel ("PDCCH"), or physical hybrid automatic repeat request indicator channel ("PHICH").

The base station described herein transmits the SCDS and thus provides a synchronization signal that can be transmitted with a longer periodicity (e.g., once every 100 ms or multiple seconds) than the periodicity used for PSS and SSS transmission (once every 5 ms). Also, in order to reduce inter-frequency measurement burdens for mobile devices, it is desirable to have an SCDS structure that is detectable by the mobile device in as few subframes as possible. In specifications for LTE Releases 8, 9, 10, and 11 (3rd Generation Partnership Project; 3gpp.org), each measurement-gap instance allows a mobile device to perform inter-frequency measurements within 6 ms. Therefore it is desirable if the mobile device can detect the SCDS of multiple cells within 6 ms (i.e., within a single measurement-gap instance). It is also desirable that the base station transmits the SCDS in both the dormant and the active states. In this case, the resource-element positions used for SCDS can be selected such that they do not overlap the resource-element positions used for PSS, SSS or PBCH. Further, only subframes 0, 1, 5, and 6 are guaranteed to have downlink transmissions for time division duplexing. Thus, it is desirable to limit SCDS transmission to subframes 0, 5 and the first two symbols of subframes 1 and 6. SCDS transmissions can overlap with resource elements used for PCFICH, PDCCH, or PHICH, but this would imply that legacy mobile devices cannot receive control signaling in subframes with SCDS transmission. This is an undesirable scheduling restriction. Thus, it also desirable to have the resource-element positions of SCDS not overlap with PDCCH, PCFICH, or PHICH resource-element positions.

Based on the above factors, an SCDS structure with a 6 resource-block bandwidth that can be detected within 1 subframe is likely to have a very short range (i.e., it can only be operated in a high signal to interference plus noise regime). On the other hand, if the SCDS is allowed to span multiple subframes (e.g., 6 subframes) to increase robustness, then the time needed to detect the SCDS approaches that of PSS and SSS, thereby reducing the need for a new structure. Considering this, at least for 1.4 MHz carrier bandwidth case, supporting a separate SCDS signal in addition to PSS and SSS is less beneficial. If a dormant state is to be enabled on a base station for this narrow bandwidth case, then the base station can transmit PSS and SSS in bursts with a longer periodicity. For example, PSS and SSS can be transmitted in two or three radio frames (i.e., 4 or 6 occasions of PSS and SSS) every few seconds. Therefore, the SCDS can be substituted for PSS and SSS transmitted in bursts with a longer periodicity. Assuming a minimum bandwidth of 5 MHz (e.g., 25 RBs) for SCDS opens up possibilities for a compact and robust design. SCDS design can be similar to Positioning Reference Signal ("PRS") design introduced in LTE Release 9. In this case, two bandwidths can be initially used, with more bandwidths added if needed. An example using bandwidths of 1.4 MHz and 5 MHz is described with respect to FIG. 10.

The base station periodically transmits a dormant-state message over a small-cell-discovery channel ("SCDCH") or dormant physical broadcast channel ("D-PBCH") during the dormant state, according to another embodiment. The dormant-state message allows the base station to convey information which cannot be implicitly embedded in an SCDS transmission when the cell is in the dormant state. The base station transmits the SCDCH with a greater periodicity than the PSS and SSS. In some embodiments, the base station transmits the SCDCH with a greater periodicity than the SCDS. In one example, the base station transmits the SCDS and the SCDCH as the only general or broadcast transmissions (e.g., not specific to a mobile device) during the dormant state.

When the base station is in the active state, it transmits all the synchronization signals and broadcast channels required to support mobile devices compliant with specifications for LTE Releases 8, 9, 10, and 11 (e.g., legacy mobile devices). Therefore, in the active state, at least the following periodic generic (e.g., non-mobile device-specific) transmissions are made by the base station: PSS in slot 0 and 10 of every radio frame, SSS in slot 0 and 10 of every radio frame, physical broadcast channel carrying MasterinformationBlock ("MIB") in slot 1 of every radio frame in the active state, PDSCH carrying SIB1 information in every alternate radio frame (i.e., radio frames satisfying System Frame Number ("SFN") mod 2=0) and associated PDCCH to indicate the PDSCH RBs, PDSCH carrying other SIBs in a plurality of radio frames conformant with the system information scheduling mechanisms in LTE Releases 8, 9, 10, and 11 and associated PDCCH to indicate the PDSCH RBs, and common reference signals ("CRS") in every slot of every radio frame except for the second slot in a Multicast Broadcast Single Frequency Network ("MBSFN") subframe (MBSFN subframe information typically signaled in SIB2). Given the above list of signals and channels, the base station, in the active state, has at least one transmission in every slot, i.e., a periodicity of once every 0.5 ms.

In addition to the transmissions in the above list, the base station can also transmit one or more of the cell-discovery signal or cell-discovery channel when in the active state. If the cell-discovery signal or cell-discovery channel has a structure that is detectible in fewer slots than the slots required for detecting the PSS and SSS, then the transmission of the cell-discovery signal or cell-discovery channel in the active state can help in reducing the measurement burden of mobile devices making inter-frequency measurements on the transmitting cell. For example, a first cell can transmit a discovery signal and discovery channel on a carrier with center frequency $f_1$ and with a periodicity of once every 150 ms. A mobile device connected to a second cell operating on a carrier with center frequency $f_2$ can attempt to detect the first cell by either attempting to detect the PSS and SSS on the first cell or the discovery signal on the first cell. Using techniques described herein, the discovery signal transmission can be made more robust than PSS and SSS transmissions so that a mobile device is able to detect the first cell in "one shot" if it uses the cell-discovery signal (i.e., by receiving only one instance of the cell-discovery signal) instead of the PSS and SSS, which requires a longer detection time (e.g., receiving 4 or 5 instances of PSS and SSS) in certain conditions.

The base station transmits the SCDS in all slots or a subset of slots within a radio frame based on a first periodicity. The first periodicity is greater than a second periodicity of the PSS and SSS or other signals typically transmitted in the active state. In LTE, a radio frame contains 10 subframes, where a subframe is 1 ms duration and includes two slots, each slot of 0.5 ms duration. Only subframes 0, 1, 5, and 6 are guaranteed to have downlink transmissions for a time division duplex configuration, thus, the base station in one example transmits the SCDS using subframes 0, 5 and the first two symbols of subframes 1 and 6. Examples of the first transmission duration and first periodicity include 1 millisecond every 100 milliseconds, 5 millisecond every 1 second, or every $15^{th}$ system frame, while examples for the second transmission duration and second periodicity include 1 millisecond every 5 milliseconds or multiple symbols in every 1 millisecond subframe. Other values for the first or second periodicities will be apparent to those skilled in the art. The greater periodicity of the SCDS allows for reduced power consumption by the base station and the mobile device for synchronization and also reduces overall network interference. In some cases, the base station uses the PSS and SSS during an active state and uses the SCDS during a dormant state.

Figure 11:
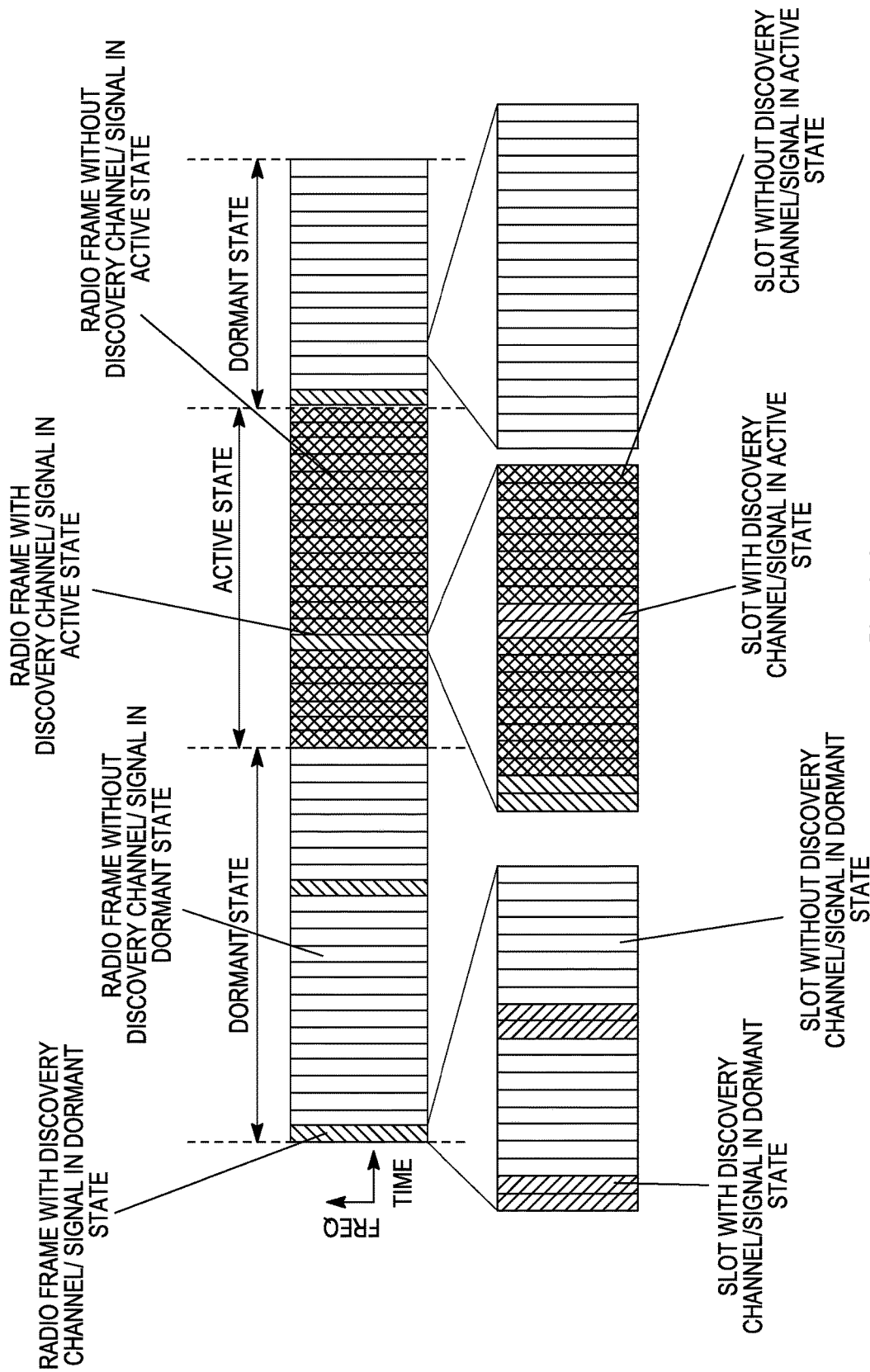
FIG. 11 is a diagram illustrating radio frames transmitted by a base station of the system of FIG. 1, according to an embodiment.

Turning to FIG. 11, a base station (or a cell) can transmit one or more of a pilot signal, reference signal, or synchronization signal (usually referred to as a cell-discovery signal) in radio frames when operating in a dormant state. In one implementation, a base station can periodically transmit the cell-discovery signals. The base station can also periodically transmit a physical broadcast channel (usually referred to as a cell-discovery channel) that is associated with the cell-discovery signal with a same or longer periodicity when in the dormant state. When the base station is in an active state, the base station can transmit additional synchronization signals and broadcast channels with a shorter periodicity when compared to the dormant state.

FIG. 11 illustrates multiple radio frames, some transmitted when the cell is in active state, and some transmitted when the cell is in dormant state. In LTE, each radio frame has 10 ms duration and consists of 20 slots numbered from 0 to 19. Each slot is 0.5 ms. Consecutive slots are usually referred to as subframes (e.g., slot 0, 1 is one subframe, slots 2, 3 another subframe etc.). The radio frames are usually indexed with an SFN. When the cell is in the dormant state as shown in FIG. 11, it transmits the discovery signal or discovery channel in every $15^{th}$ radio frame (i.e., radio frames satisfying SFN mod 15=0). The discovery signal or discovery channel can be present in all slots or a subset of slots within that radio frame (e.g., slots 0, 1, 9, 10). The discovery signal or discovery channel transmissions can be the only periodic non-mobile device-specific transmissions (e.g., generic transmissions) made by the cell in the dormant state.

In other embodiments, the base station transmits the SCDS in both the active state and the dormant state. The active and dormant-state SCDSs in one example are transmitted with different periodicities. In this case, the base station transmits the SCDS at a shorter periodicity (i.e., more frequently) (e.g., 5 or 10 millisecond intervals) in the active state than in the dormant state (e.g., 100 ms, 200 ms, 1 second, or more). This technique allows faster discovery and handover to active cells and provides interruption durations similar to techniques provided by LTE Release 8 for a handover from a macro cell to an active small cell.

In embodiments where the SCDS has a structure that is detectible in fewer slots than the slots typically required for detecting the PSS and SSS, the transmission of the SCDS in the active state allows a reduction in a measurement burden on mobile devices making inter-frequency measurements on the cell transmitting the discovery signal. The base station optionally omits the PSS and SSS when transmitting the SCDS in both the active and dormant states and thus the SCDS is used instead of the PSS and SSS. In one example, the base station transmits the SCDS as the only general signal or data transmission during the dormant state.

The SCDCH in one example has a same bandwidth as the SCDS. The bandwidth of the discovery channel or SCDS may not be equal to the transmission bandwidth configuration of a carrier. Instead they can be transmitted with a fixed bandwidth (or a fixed set of blindly detectable bandwidths) that is known a priori or predetermined to the mobile devices. In LTE Releases 8, 9, 10, and 11, PSS, SSS, and PBCH are transmitted with a fixed bandwidth of 6 RBs. In one example, the bandwidth of the SCDCH and SCDS signals is fixed at 25 RBs. Alternately, the mobile devices may be made to blindly detect the bandwidth of these signals from a set of allowed bandwidths (e.g., 6 RBs and 25 RBs). In a further example, the base station transmits the SCDCH and the SCDS in the same or adjacent subframes. This allows the mobile device to use channel estimates obtained for detection of the SCDS for demodulation of the SCDCH. Alternatively, a predefined pattern of reference signals (e.g., the pattern used for demodulation reference signals or CRS in LTE Release 11 specifications) can also be transmitted along with D-PBCH to assist its demodulation. This reference signal pattern can also be a function of an identifier determined during SCDS detection. The identifier may be a small-cell identifier ("SCID") or an extended physical-cell identifier ("E-PCID").

The SCDS and SCDCH in one example have a fixed bandwidth or a set of fixed bandwidths (e.g., six RBs or 25 RBs) that are known a priori to the mobile device, thus enabling blind detection by the mobile device. An RB in a subframe includes 12 subcarriers in frequency and the symbols within a slot (e.g., 7 symbols in a slot when normal cyclic prefix duration is used) in time where the subcarrier spacing is 15 kHz. In one example, the bandwidth of the SCDS and SCDCH are fixed to 25 RBs to allow for one-shot detection of the SCDS.

In other embodiments, the base station transmits other dormant transmissions (e.g., signals or channels) in addition to the SCDS and the SCDCH during the dormant state (e.g., a "semi-dormant" state). These dormant transmissions can include a reduced cell reference signal transmission (i.e., transmission of a pilot sequence in the fifth subframe of every radio frame on resource elements corresponding to a CRS antenna port), new broadcast channel transmissions associated with demodulation reference signals instead of CRS (i.e., the demodulation reference signals are used to demodulate the broadcast channel transmissions), or other new control channel transmissions such as a common search space for an enhanced physical downlink control channel.

Such transmissions can be used by advanced mobile devices (e.g., mobile devices supporting future releases of LTE specifications such as LTE Release 12) for connecting to and communicating with the cell even when it is in dormant state. The energy spent by the cell in the dormant state of this implementation is higher than the energy spent in the dormant state described above (e.g., a dormant state with only the SCDS and SCDCH). However, when compared to the energy spent in the active state (e.g., where CRS is transmitted in every slot), the overall energy spent is still lower.

In some embodiments, in the dormant or semi-dormant state, the base station supports some or all of the procedures required to service idle-mode mobile devices. In one implementation, the mobile device can determine various parameters and information from receipt of the dormant-state message.

In some embodiments, if the mobile device has not previously received system information from a cell, and if it detects the cell while the cell is in the dormant state, it then initiates a cell wake-up procedure to transition the cell from the dormant state to the active state. The mobile device then downloads the system information (e.g., MIB and SIB1 through SIB11 as described in LTE specifications) from the cell and stores the value tag (e.g., an integer with range 0 to 31) associated with the downloaded system information. The mobile device determines the paging occasions and paging frames corresponding to its mobile device ID from the downloaded system information. The mobile device then monitors PDCCH or Enhanced PDCCH ("EPDCCH") for downlink control information with cyclic redundancy check scrambled by a paging radio network temporary identity in the paging occasions. The mobile device also continues monitoring SCDS and D-PBCH for any change in system information or cell state in embodiments where the SCDS and D-PBCH are transmitted in the active state. The mobile device determines whether the system information has changed by comparing the value tag it has stored with the value tag transmitted in the D-PBCH. In this embodiment, if the cell moves to the dormant state, then the mobile device does not re-initiate the wake up procedure to move the cell to active state. Instead, the mobile device continues monitoring SCDS and D-PBCH as long as the system information of the cell is unchanged (e.g., as long as the value tag received in D-PBCH matches the value tag stored when the mobile device previously received SIB1).

This technique allows a mobile device to leave and re-enter the coverage area of a base station in an efficient manner. The mobile device downloads and store system information from the base station. The mobile device then leaves and later re-enters the coverage area of the base station. If the base station is in the dormant state when the mobile device re-enters and the value tag of the system information associated with the cell transmitted in the D-PBCH indicates that the system information has not changed, then the mobile device does not wake up the base station to again download system information or check its validity. Instead, the mobile device uses the value tag transmitted in the dormant state to determine the validity of the previously stored SI.

In some embodiments, while the cell is in the dormant state (from the perspective of the mobile device), and the mobile device is camped on the cell in Radio Resource Control ("RRC") idle mode, the mobile device can follow the same procedures as specified in LTE specifications in response to the following events: (1) The mobile device detects that system information has changed (either from value tag on D-PBCH or via a paging message indicating the change); (2) The mobile device detects a paging message in its paging occasion; or (3) The mobile device has uplink data to transmit and has to send a connection request. The cell, however, has to switch from dormant to active state whenever there is a system information change, or whenever it receives a page message for a mobile device which belongs to the same tracking area as the cell, or whenever it receives a wake up signal or Random Access Channel ("RACH") from a mobile device camped on the cell.

In some embodiments, the base stations operates in a dormant or semi-dormant state even when idle-mode mobile devices are camped on the cell. The base station may support some or all of the procedures required to service idle-mode mobile devices. In some embodiments, only SCDS and D-PBCH (with a small payload containing the value tag) are transmitted with a longer periodicity (e.g., once every 100 ms or once every 1 second) by the base station. In some embodiments, the mobile device can wake up more often compared to idle modes in LTE Releases 8, 9, 10, or 11, as it has to not only wake up for monitoring its paging occasions but also wake up for monitoring SCDS and D-PBCH. The effect of additional "wake-ups" can be reduced by making the mobile device monitor an alternative paging occasion that is adjacent (or closer in time domain) to the SCDS and D-PBCH transmission when the cell is in the dormant state. For example, the alternative paging occasion can be present in the same subframe where SCDS or D-PBCH are monitored by the mobile device. Alternatively, a subframe offset, which may be relative to the subframe where SCDS or D-PBCH is monitored by the mobile device, for the alternate paging occasion (different offsets can be applicable to different mobile device IDs) can be signaled in the D-PBCH. Thus, if the mobile device determines that the cell is in the dormant state, then it monitors a first control channel for a paging indication in a first paging occasion occasion or a first time/frequency location (the location is determined based on SCDS position or a subframe offset signaled in D-PBCH). If the mobile device determines that the cell is in the active state, then it monitors a second control channel for paging indication in a second paging occasion occasion or a second time/frequency location (the location is determined from system information received in MIB and SIBs when the cell is in the active state).

A similar approach can be used to modify the RACH transmissions from the mobile device to reduce the eNB RACH monitoring instances in dormant state. If the mobile device determines that the cell is in the dormant state, then it transmits RACH in a first set of locations (the locations are determined based on SCDS position or a subframe offset signaled in D-PBCH; the offset may be relative to the subframe where the SCDS or D-PBCH is monitored by the mobile device), and if the mobile device determines that the cell is in active state, then it transmits RACH in a second set of locations (the locations determined from SI received in MIB and SIBs when the cell is in active state).

In some embodiments, a base station supports an active state as described above, a semi-dormant state with the SCDS and SCDCH and other dormant transmissions described above, and a dormant state with only the SCDS and SCDCH.

The base station in one example supports event-triggered transmissions, such as paging indications (e.g., when a paging message is received from a public land mobile network associated with the cell), RACH response transmissions (e.g., when a RACH is received from a mobile device camped or connected to the cell), or other idle-mode procedures for mobile devices. In some implementations, such transmission can be supported by the cell during the dormant or semi-dormant state in addition to the active state. In other implementations, the base station can switch from the dormant state to the active state in response to such events and make the related transmissions in the active state. In some other implementations, the base station can stay in dormant state for some events and switch to active state for other events. For example, a base station can transmit a paging indication while in the dormant state, and wait for a RACH transmission from the mobile device in response to the paging indication, and after receiving the RACH transmission, switch to the active state to transmit a RACH response to the mobile device.

In embodiments where the base station transmits a dormant stat message such as on the D-PBCH, the dormant-state message includes one or more parameters for the wireless network 160. Examples of the parameters include wake-up signal parameters, system information parameters, dormant-state parameters (e.g., paging parameters such as a subframe offset for paging occasions for monitoring paging indications during the dormant state), active-state parameters, a PCID (e.g., for implementations where the PCID cannot be implicitly determined from SCID), a cell state indicator, a system frame number, or physical layer configuration parameters. Examples of wake-up signal parameters include a RACH preamble sequence index, an uplink evolved universal mobile telecommunications system terrestrial radio access absolute radio frequency number ("EARFCN") of an uplink carrier for RACH transmission by a mobile device, a subframe offset (e.g., the offset may be relative to the subframe where the SCDS or D-PBCH is monitored by the mobile device) for RACH transmission, or a resource-block offset for RACH transmission.

Examples of system information parameters include master information block parameters, a subframe offset (e.g., relative to the SCDS or D-PBCH subframe) to locate a master information block transmission when transmitted during the active state, an update-indicator field, or a value tag. The subframe offset information can be useful if the subframe index used for SCDS or D-PBCH transmission is configurable (i.e., unlike PSS, SSS, or PBCH transmissions which occur in fixed and non-configurable subframes (or at predetermined locations known to the mobile device such as subframe 0 or 5 for frequency-division multiplexing). The update-indicator field or value tag is a value (e.g., an integer or flag) that indicates whether the system information has changed. Examples of the cell state indicator include an active or dormant-state indicator or a carrier type indicator. In one example, the cell state indicator is an explicit indicator of the cell's state, such as one bit that indicates a dormant or active state. In another example, the cell state indicator has two bits to indicate the dormant or active state and also a carrier type being used by the cell in one or both states (e.g., legacy vs. new carrier type). Examples of the physical layer configuration parameters include downlink and uplink bandwidth, antenna configuration, or power control parameters. The mobile device can receive such physical layer configuration parameters in MIB and SIBs but transmitting them in the D-PBCH can potentially reduce the time required by the mobile device to transition from RRC idle mode to "RRC_connected" mode, without waiting for the cell to transition to active mode. While all of the above parameters can be signaled in D-PBCH, the additional flexibility provided by their transmission can result in significantly increased overhead and reduced energy savings during dormant-state operation of the cell. Therefore, in some embodiments, the base station transmits only a subset of the parameters described above and allows the mobile device to acquire other parameters from MIB or Ms. For example, an implementation of D-PBCH (i.e., a dormant-state message transmitted on the D-PBCH) can only include a value tag that indicates whether the system information of the cell has changed from a previous setting.

Figure 3:
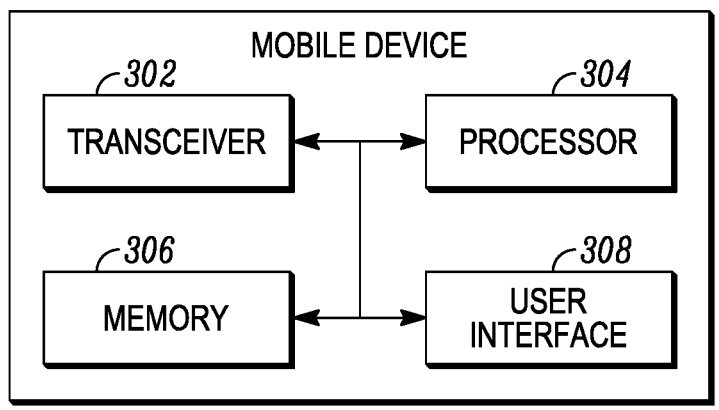
FIG. 3 is a block diagram of a mobile device of the system of FIG. 1, according to an embodiment.

Turning to FIG. 3, a block diagram 300 depicts a possible implementation of the mobile device 150 of FIG. 1. The mobile device includes a transceiver 302 configured to transmit signals or data to and receive signals or data from other devices such as the base station 110, 120, 130, or 140 or other mobile device. The mobile device also includes a processor 304 that executes stored programs and at least one memory 306. The processor 304 writes data to and reads data from the memory 306. The mobile device includes a user interface 308 having a keypad, display screen, touch screen, microphone, speaker, or the like. During operation, the transceiver 302 receives data from the processor 304 and transmits RF signals representing the data. Similarly, the transceiver 302 receives RF signals, converts the RF signals into appropriately formatted data, and provides the data to the processor 304. The processor 304 retrieves instructions from the memory 306 and, based on those instructions, provides outgoing data to, or receives incoming data from, the transceiver 302.

In an embodiment, the user interface 308 displays the output of various application programs executed by the processor 304. The user interface 308 additionally includes on-screen buttons that the user can press in order to cause the mobile station to respond. The content shown on the user interface 308 is generally provided to the user interface at the direction of the processor 304. Similarly, information received through the user interface 308 is provided to the processor 304, which can then cause the mobile station to carry out a function whose effects may or may not necessarily be apparent to a user.

The mobile device monitors for the SCDS from the base station to synchronize with the wireless network 160. The mobile device scans and detects the SCDS automatically (e.g., based on preconfigured instructions stored in the memory 306) or based on information or parameters received from another network element (e.g., another base station) of the wireless network 160. The other network element in one example provides an indication of radio resources (e.g., carrier frequencies, subframes, RBs, or resource elements) for the mobile device to use in scanning for the base station. In an idle mode, the mobile device monitors for a physical downlink control channel and paging occasions and, when camped on a dormant base station, the SCDS and SCDCH. In one example, the mobile device camps only on base stations that are in an active state.

Figure 4:
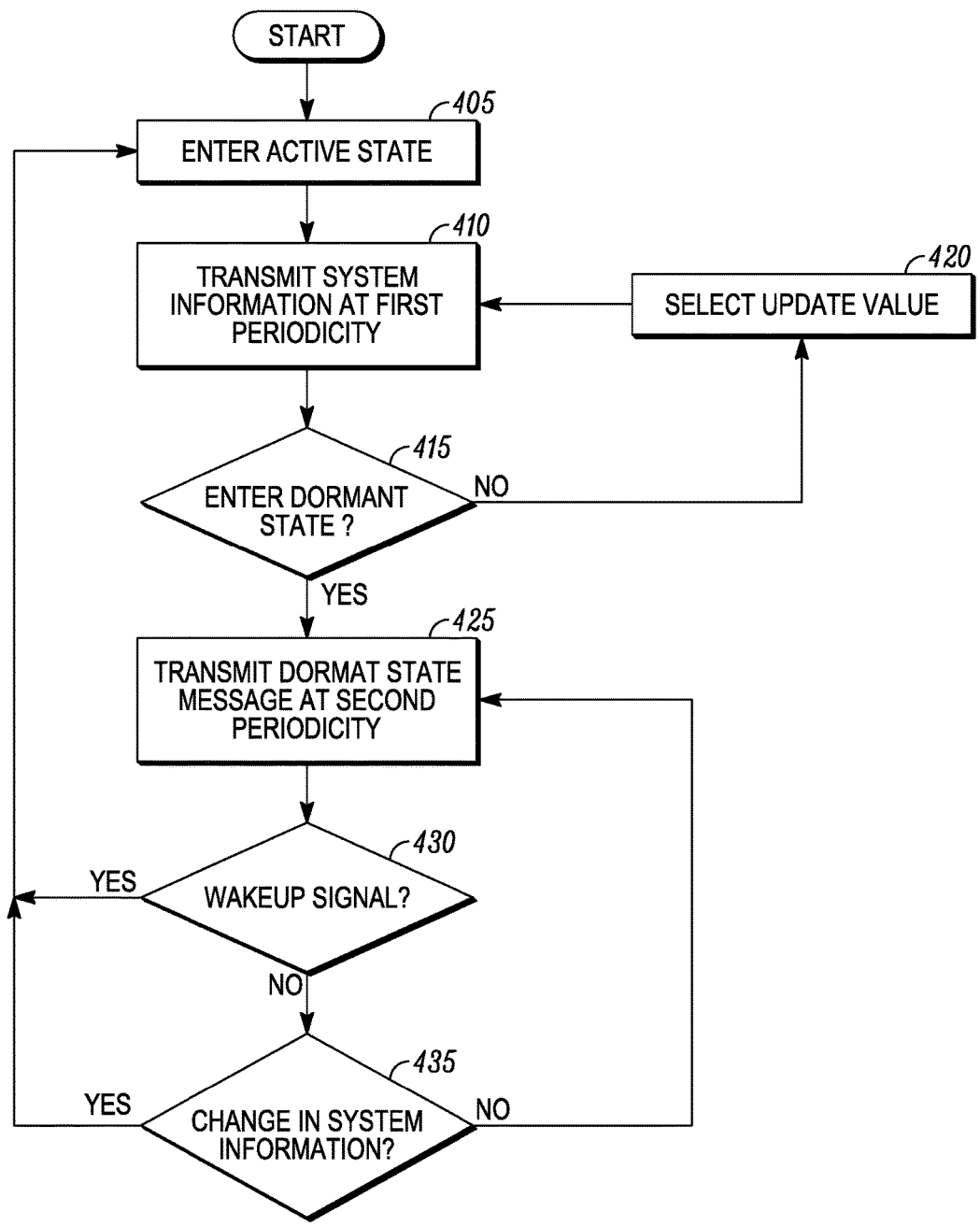
FIG. 4 is a flowchart of a method carried out by the base station of FIG. 1, according to an embodiment.

Turning to FIG. 4, a flowchart depicts one example of a method for the base station to provide an indication of a change in system information. The base station enters (405) an active state. During the active state, the base station transmits (410) system information using the same procedure as described in LTE Release 11 specifications. The system information includes at least one SI message. The SI message can be a SIB1 message. The SIB1 message can be transmitted with a first periodicity (e.g., 20 ms or every alternate radio frame including retransmissions). The SIB1 message includes a first update-indicator field. The first update-indicator field can be a first value tag field (e.g., an integer with range 0 to 31) that is associated with the system information.

The base station determines (415) whether to enter a dormant state, for example, based on a number of mobile devices currently connected, expiration of a timer (e.g., five minutes), or other factors. In one example, the base station enters the dormant state if it has not configured any mobile devices in an RRC_connected mode as described in LTE specifications for a predetermined time period (e.g., 5 minutes). The base station may set or modify the timer time period based on the type of the mobile device that transmitted the wake-up signal during its recent transition from dormant to active state or the type of the mobile device it served recently in active state. For example, a high priority mobile device such as a public safety device transmitting a particular wake-up signal (e.g., a RACH preamble from a reserved set of RACH preambles for high priority mobile devices) may result in the base station timer time period value to be set to a different value from that of receiving a wake-up signal from a normal priority mobile device. If the base station does not enter the dormant state (NO at 415), then the base station continues transmitting (410) system information with the first periodicity. While in the active state, the base station selects (420) an update value (e.g., an integer) for the first update-indicator field. The first update-indicator field provides an indication to a mobile device as to whether the system information has changed since a previous transmission of a previous SIB1 message. Thus, if the system information has not changed, then the base station continues to transmit (410) the SI messages using the same update value for the first update-indicator field.

During the dormant state (YES at 415), the base station transmits (425) a dormant-state message, as described above, at the second periodicity (e.g., 100 ms, 1 second, or more) that is greater than the first periodicity. The dormant-state message may be transmitted on a D-PBCH. The dormant-state message includes a second update-indicator field that provides an indication to a mobile device as to whether the system information has changed. The second update-indicator field can be a second value tag field. The second update-indicator filed can include the same update value as the first update-indicator field of the previously sent SIB1 message in the active state if the system information has not changed. In some embodiments, when the base station (or the cell) transitions to a dormant state, the mobile devices that are camped on the cell, but not connected to that cell, can reselect to a different cell or initiate a wake up procedure to transition the cell from dormant to active state.

The base station determines (430) whether a wake-up request has been received. Examples of wake-up requests include wake-up requests from mobile devices camped on the base station, wake-up requests from other network elements of the wireless network 160, or wake-up requests generated within the base station. The base station enters (405) the active state if the wake-up signal is received (YES at 430). If the wake-up request has not been received (NO at 430), then the base station determines (435) whether the system information has changed. If the system information has not changed (NO at 435), then the base station continues to transmit (425) dormant-state messages with the update value from the update-indicator field of the previously sent SI message as the value for the second update-indicator field. If the system information has changed (YES at 435), then the base station returns to the active state (405) and sends (410) the updated system information. In one embodiment, the cells support, in the dormant state, some or all of the procedures required to service idle mobile devices. In one implementation of this embodiment, if the cell is in dormant state, then the mobile device can determine some information from the SCDS and a broadcast channel that is transmitted along with the SCDS. The information may include detailed parameters described above such as (a) whether the system information transmitted by the cell has changed from a previous setting (e.g., using a value tag transmitted in D-PBCH), (b) wake-up signal parameters that are optionally transmitted (e.g., a RACH preamble sequence index, ULplink EARFCN of an uplink carrier where the mobile device can transmit a RACH, subframe offset for RACH transmission, RB offset for RACH transmission), and (c) dormant-state paging parameters that are optionally transmitted (e.g., a subframe offset for monitoring paging indication in dormant mode).

Figure 5:
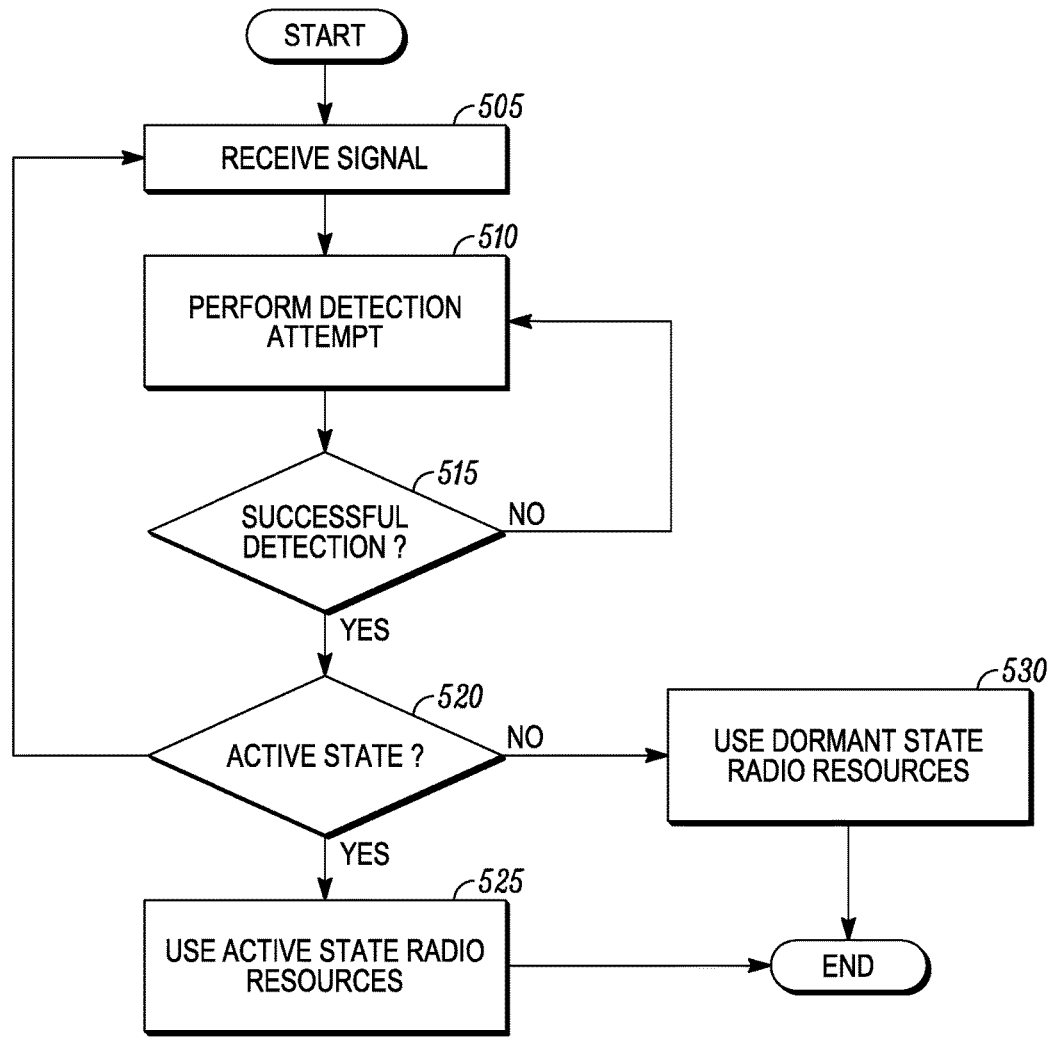
FIG. 5 is a flowchart of a method carried out by the mobile device of FIG. 1, according to an embodiment.

Turning to FIG. 5, a flowchart illustrates one example of a method for the mobile device to determine whether the base station is in an active state or dormant state based on the SCDS. The mobile device receives (505) an SCDS from the base station. The mobile device performs (510) a detection attempt on the received signal. The detection attempt is based on a characteristic of the received signal such that if the detection attempt is successful, then the mobile device determines that the base station is in either the active state or the dormant state. If the detection attempt is successful (YES at 515), then the mobile device determines (520) a current state of the base station (e.g., the active state, dormant state, or semi-dormant state). If the detection attempt is not successful (NO at 515), then the mobile device performs (510) at least one second detection attempt. The mobile device performs a separate detection attempt that is distinct from the previous detection attempt. For example, the mobile device performs a first detection attempt that corresponds to an active state for the base station and a second detection attempt that corresponds to a dormant state for the base station. In some embodiments, the mobile device performs a plurality of detection attempts, in a sequence or in parallel, to detect the received signal.

The base station selects and transmits the SCDS based on its current state, thus allowing the mobile device to determine the current state based on the received signal. In one embodiment, the base station selects a cell identifier (e.g., an SCID) from a first set of cell identifiers that correspond to an active state or from a second set of cell identifiers that correspond to a dormant state. The first and second sets of cell identifiers can be disjoint. The base station transmits a pilot sequence for the SCDS based on the selected cell identifier. The mobile device performs (510) one or more detection attempts blindly to detect the transmitted pilot sequence and thus determine the corresponding cell identifier. In this case, the mobile device determines that the base station is in the active state if the detected cell identifier is in the first set of cell identifiers and in the dormant state if the detected cell identifier is in the second set of cell identifiers. In one example, the second set of cell identifiers is distinct from the first set of cell identifiers.

In another embodiment, the second set of cell identifiers is offset from the first set of cell identifiers by a predetermined value. For example, the base station generates the pilot sequence based on a first SCID X if the base station is in the active state, and, if in the dormant state, then the pilot sequence is based on X+N where X is the SCID of the cell and N is the predetermined value. The predetermined value may be a large integer greater than the largest allowed SCID value. If the possible set of SCID values is {0, 1, ..., 4031}, then the predetermined value N=4032. In this case, for each SCID value X, the mobile device makes two attempts for detection: a first attempt based on a pilot sequence generated using X and a second attempt based on a pilot sequence generated using X+N. If the first detection attempt succeeds, then the mobile device determines that the base station is in the active state. If the second detection attempt succeeds, then the mobile device determines that the base station is in the dormant state.

According to another embodiment, the base station generates the pilot sequence for the SCDS using a Gold sequence generator (similar to the one described in 3rd Generation Partnership Project Technical Specification 36.211) or another well known sequence generator. In this case, the base station initializes the Gold sequence generator with a first initialization state during the active state and with a second initialization state during the dormant state. The initialization states in one example are functions of a state bit that corresponds to the active state or dormant state (e.g., 0 for dormant, 1 for active). In this case, the mobile device performs a first detection attempt assuming that the SCDS is generated using a gold sequence that is initialized using a first value and a second attempt assuming that the SCDS is generated using a gold sequence that is initialized using a second value. The mobile device determines (510) whether the transmitted pilot sequence corresponds to a first gold sequence generated with the first initialization state or a second gold sequence generated with the second initialization state. If the first detection attempt succeeds, then the mobile device determines that the base station is in the active state. If the second detection attempt succeeds, then the mobile device determines that the base station is in the dormant state.

In another example, the base station uses a same base sequence (e.g., one generated based on the SCID) for the SCDS and selects a scrambling sequence based on the current base station state. The scrambling sequence is applied to the base sequence to generate the pilot sequence for the SCDS. In another example, the base station uses the same base sequence (e.g., generated based on the SCID) for the SCDS and selects a cyclic shifts value based on the current base station state. In yet another example, the base station transmits the SCDS using a first set of radio resources (e.g., time-frequency resources) during the active state and using a second set of radio resources during the dormant state. In another example, the base station uses different resource hopping patterns for the SCDS time-frequency resource/resource mapping as a function of the base station state. In yet another example, the base station uses different pilot sequence hopping patterns for the SCDS as a function of the base station state.

The mobile device in one embodiment performs one or more detection attempts for active base stations before performing detection attempts for dormant base stations. In this case, the mobile station only scans for dormant base stations if no active base stations are detected. In another example, the mobile device uses assistance information from another network entity that indicates one or more SCIDs with a higher priority. In this case, the mobile device performs detection attempts for the indicated SCIDs in both the active and dormant state before proceeding to other SCIDs.

The mobile device can use different radio resources, such as a paging occasion, based on the current state of the base station. If the base station is in the active state (YES at 520), then the mobile device uses (525) a first set of radio resources (e.g., active-state paging occasions). If the base station is in the dormant state, then the mobile device uses (530) a second set of radio resources (e.g., dormant-state paging occasions). As one example, the mobile device scans for a paging message from the base station using a first set of paging radio resources if the base station is in the dormant state and using a second set of paging radio resources if the base station is in the active state.

The first set of radio resources for the active state is different from the second set of radio resources for the dormant state. In one example, the second set is selected such that the random access channel or paging occasions for the mobile devices are in RBs or subframes that are adjacent or near the SCDS. This allows the mobile device to scan for a paging indication, respond to the paging indication, and maintain synchronization with the wireless network 160 via the SCDS by scanning only a relatively small period of time. This technique reduces the power consumption of the mobile device and the base station by reducing the period of time over which they must scan or transmit.

In one embodiment, the first and second sets of radio resources are predetermined by a network operator of the wireless network 160. In this case, the mobile device and base station store an indication of the first and second sets of radio resources. In another embodiment, the base station indicates the second set of resources by providing one or more dormant-state parameters in the system information provided during the active state. Examples of the dormant-state parameters include a subframe offset or explicit RBs that are selected by the base station.

The above-described mechanisms allow the mobile station to differentiate between active and dormant base stations in cell discovery and search procedures. For example, a mobile device can perform a cell discovery and search method where it first scans for all SCDS sequences that correspond to active base stations, and only if it is unable to detect an active base station, it then proceeds to scan for SCDS sequences corresponding to dormant base stations. In another example, the mobile device can scan for some preferred SCIDs corresponding to some preferred base stations (e.g., via assistance information) using both active state SCDS sequences and dormant-state SCDS sequences, and if the mobile device does not detect its preferred base stations in either active or dormant state, it can then proceed to scan for other base stations using their active state SCDS sequences first and later using their dormant-state SCDS sequences. These approaches help in reducing the overall time taken by the mobile devices to not only detect a base station (which can be done when the base station is in the active or dormant state) but also to transmit and receive user-specific data traffic to or from the base station (usually this is done when the base station is in active state).

A longer periodicity broadcast channel transmitted along with SCDS (e.g., D-PBCH) can also be used for indicating the active or dormant state of a base station. This approach reduces a worst-case SCDS scanning burden on the mobile device as the mobile device has to only search for one set of SCDS sequences irrespective of base station state (instead of multiple sets based on base station state as described earlier). However, this approach can increase an average scanning burden as the mobile device cannot preemptively ignore dormant base stations in its scanning procedure as it first has to successfully detect the SCDS of a base station before proceeding to decode the broadcast channel where the indication of base station state is present.

Figure 6:
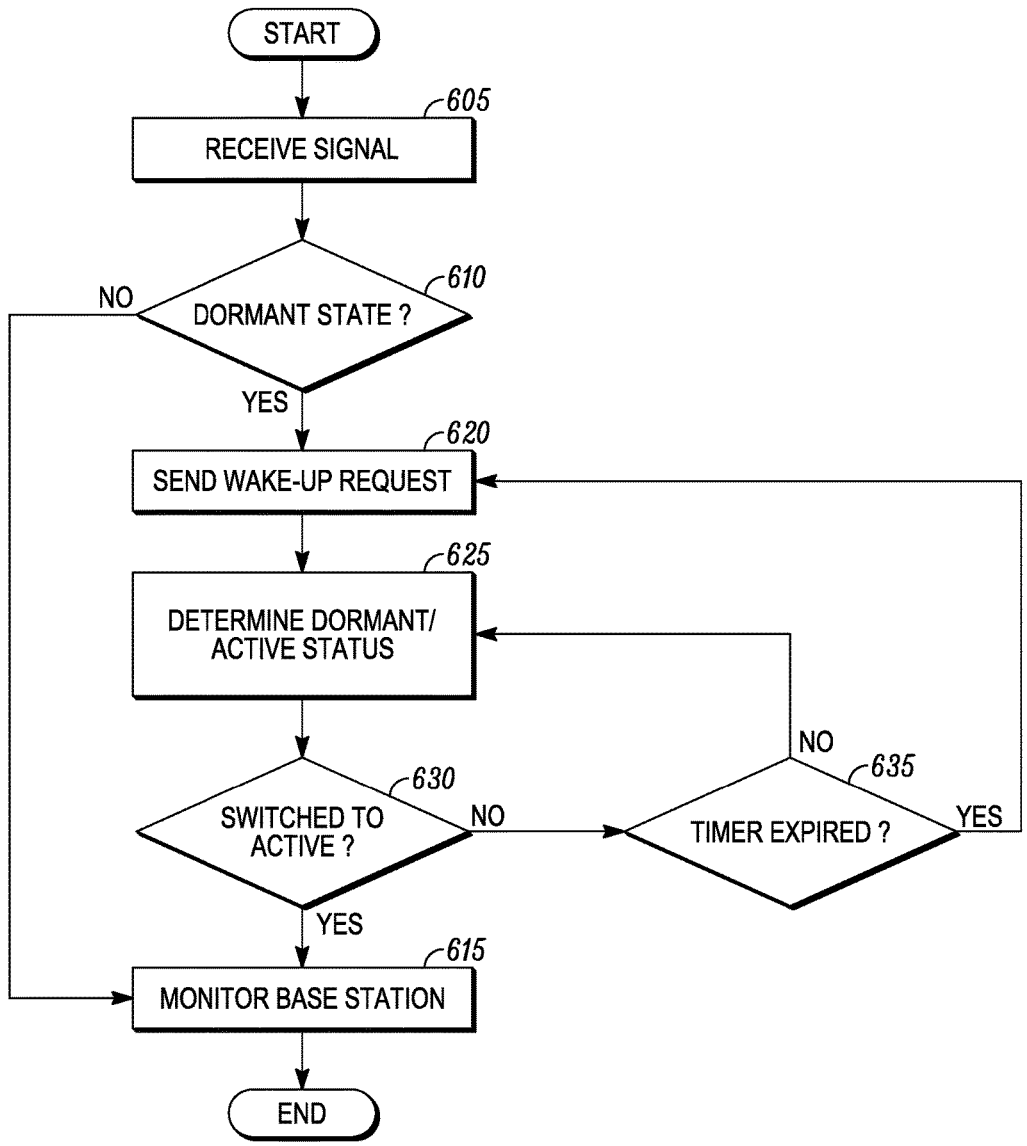
FIG. 6 is a flowchart of another method carried out by the mobile device of FIG. 1, according to an embodiment.

Turning to FIG. 6, a flowchart illustrates one example of a method for the mobile device to send a wake-up request to a base station in a dormant state. The mobile device wakes the base station to transition to an active state in order to camp on the base station, receive system information, perform a handover, or send a data transmission. In this case, the mobile device camps only on cells that are in an active state. The mobile device receives (605) a signal from the base station. In a first example, the signal is the SCDS. In another example, the signal is the dormant-state message transmitted via the dormant physical broadcast channel.

The mobile device determines (610) whether the base station is in the dormant state or the active state based on the received signal (as described herein). If the base station is in the active state (NO at 610), then the mobile device monitors (615) the base station using the first set of radio resources, as described above with reference to FIG. 5. If the base station is in the dormant state (YES at 610), then the mobile device sends (620) a wake-up request to the base station. In other embodiments, the mobile device sends the wake-up request to a base station if the mobile device has not yet received system information from the base station. The wake-up request is a signal, message, or preamble which triggers the base station to transition to the active state.

The base station transmits wake-up signal parameters to the mobile station, which the mobile station then uses to transmit the wake-up signal. The base station monitors for the wake-up request using the radio resources indicated to the mobile device. As described above, examples of wake-up signal parameters include a RACH preamble sequence index, an uplink EARFCN of an uplink carrier for RACH transmission by the mobile device, a subframe offset for RACH transmission, or a resource-block offset for RACH transmission. In one example, the mobile device transmits a RACH preamble sequence as the wake-up signal (e.g., with one of the pre-specified formats described in LTE Release 8, 9, 10, or 11) in a subframe and a set of RBs on an uplink carrier. The RACH preamble sequence can be selected from a set of possible RACH preamble sequences based on the detected SCID or type of mobile device. The mobile device can determine the set of RBs and the EARFCN of the uplink carrier from the SCID, SCDS, or Dormant-PBCH. The subframe in which the mobile device transmits the RACH can have a fixed timing offset from the subframe in which it detects SCDS or can be based on the SCID. Alternately, if a Dormant-PBCH message is received by the mobile device, then a subframe offset can be included in that message. For example, if the mobile device detects SCDS in subframe p, then it can transmit the RACH in subframe p+W where W is the subframe offset.

After sending the wake-up request, the mobile device continues to monitor the SCDS or D-PBCH to determine (625) the current status of the base station. For example, the mobile device determines whether the base station has transitioned from dormant to active state based on a change in SCDS, SCID, or Dormant P-BCH. If the base station has transitioned to the active state (YES at 630), then the mobile device receives (615) the system information from the base station. In this case, the mobile device downloads system information from the base station and starts monitoring the PDCCH or EPDCCH of the base station for paging indications.

While the base station has not transitioned to the active state (NO at 630), the mobile device optionally starts a wake-up timer after sending the wake-up request. If the wake-up timer has not expired (NO at 635), then the mobile device continues to determine (625) the current status of the base station. If the wake-up timer has expired (YES at 635), then the mobile device sends another wake-up request to the base station. In other embodiments, if the mobile device is unable to detect the transition to the active state after several transmissions of the wake-up signal, then the mobile device selects another base station on which to camp.

In some embodiments, the mobile device camps only upon active cells. In this case, information that a cell has to support in the dormant state is minimized. In some cases, it is possible to not transmit a longer periodicity broadcast channel along with SCDS thereby saving time, frequency, and energy resources. For example, a cell can only support SCDS transmissions (e.g., a pilot sequence spanning mapped to multiple symbols and a subset of subcarriers in a subframe) in the dormant state and wake-up parameters (e.g., information on how to wake up the cell) can be determined by the mobile device from the SCID detected from the SCDS and a set of predetermined rules (e.g., a predefined subframe offset from the subframe on which SCDS is received or a predefined mapping table that indicates a preamble sequence to use when a particular SCID is detected). In dense small cell networks, many small cells may not have mobile devices camped in idle mode within their coverage area. Since paging indications (e.g., a PDCCH with downlink control information scrambled by a paging radio network temporary identity) or messages (e.g., a paging medium access control element transmitted on PDSCH) are only required to be transmitted by cells that have been switched to active state by idle-mode mobile devices that are camped on them, unnecessary paging transmissions in cells that do not have any idle-mode mobile devices are reduced.

Where the mobile device only camps on active base stations, procedures that are required to service idle-mode mobile devices (i.e., transmission of system information and paging messages) may not be supported in the dormant state. In scenarios where most small cells have idle-mode mobile devices camped within their coverage area, the benefits or supporting a dormant state are not fully realized as most cells are forced to be in active state. Also, if a mobile device is camped on a cell for a prolonged period without establishing a connection to the cell (i.e., the mobile device has no data incoming from or outgoing to the cell), then the cell may time out and move to dormant state, and the mobile device may have to repeatedly wake up the cell (e.g., once every 5 minutes) to move it back to active state.

Figure 7:
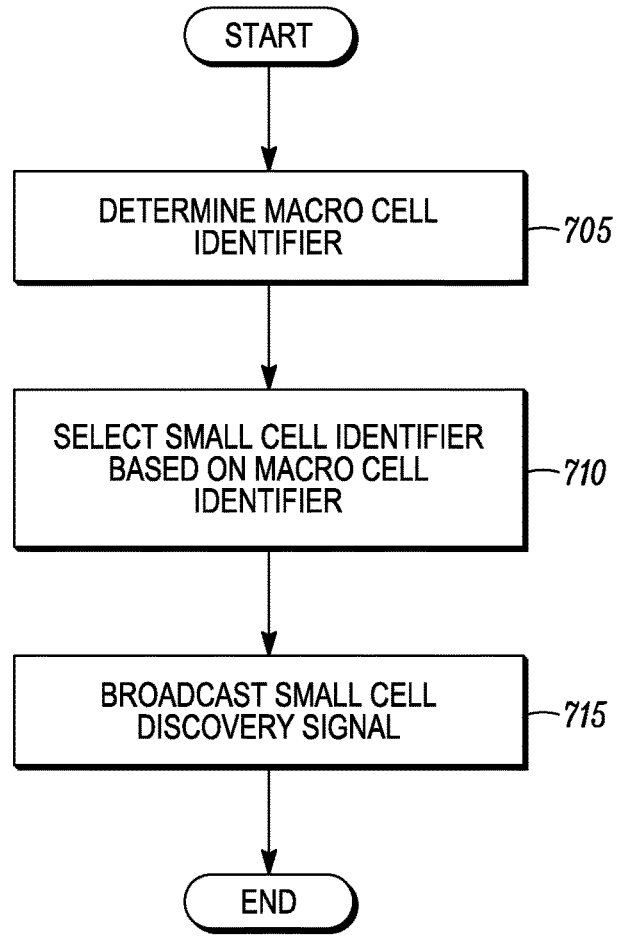
FIG. 7 is a flowchart of yet another method carried out by the mobile device of FIG. 1, according to an embodiment.

Turning to FIG. 7, a flowchart illustrates a method for determining a cell identifier, such as a PCID, based on a SCDS. In this case, the base station determines a SCDS (e.g., a pilot sequence) based on a PCID, such as, for example, using the PCID as an initialization value or an offset value in the construction of the pilot sequence used for SCDS transmission. In another example, the base station uses the PCID as an initialization or offset value for selection of radio resources or resource mapping used for transmission of the SCDS. In another example, one or more characteristics of the SCDS are based on at least a portion of the PCID value. The characteristic of the SCDS can include pilot sequence waveform, cyclic shift value of the SCDS pilot sequence, pilot sequence hopping pattern on different time-frequency resources (e.g., different pilot sequence waveforms on different OFDM symbols), resource hopping pattern of the SCDS time-frequency resource/resource mapping (e.g., different set of subcarriers on different OFDM symbols), etc. This allows the mobile device to attempt to detect the SCDS by hypothesizing various values of the PCID from a set of allowed or configured values. The hypothesized value that meets a predetermined detection threshold of the SCDS is then determined to be the PCID for that base station. As one example, the set of allowed values includes the values of {0, 1, . . . , 503} as defined in LTE Releases 8, 9, 10, and 11.

The base station in another example uses an SCID for identifying the small cell. In one example, the base station is associated with both an SCID and also a PCID. The base station selects the SCID from a set of allowable values that is larger than the set of allowable values for the PCID. As one example, the set of allowable values for the SCID is {0, 1, . . . , 4031}. As another example, the set of allowable values for the SCID is {504, 505, . . . , 4031}. In this case, the SCID does not overlap with PCIDs to reduce confusion in measurement reports. The mobile device determines the SCID by hypothesizing various values of the SCID from the larger set of allowable values for the SCID and selects the SCID that meets a predetermined detection threshold.

Where the base station uses the SCID, the base station in one example determines other pilot signals, reference signals, or control channels based on the SCID instead of the PCID. In this case, the base station optionally does not support communications based on LTE Releases 8, 9, 10, and 11 but instead supports a standalone new carrier type. For example, a mobile device connected to a base station associated with the standalone carrier uses the SCID to determine a sequence used for a synchronization or tracking reference signal or channel state information reference signal from that base station. The mobile device can also use the SCID to receive control channels such as an enhanced physical downlink control channel from the base station.

In another example, the base station uses both the SCID as well as the PCID. In this case, the base station transmits pilot and control channels based on the PCID (e.g., the cell reference signals and physical downlink control channel). The base station selects the SCID based on the PCID so that the PCID is determinable based on the SCID. This technique allows the mobile device to use a single cell identifier detection procedure for determination of the SCID (based on the SCDS) and thereby determine the PCID, instead of using the PSS and SSS to determine the PCID.

The base station determines (705) a physical-cell identifier (i.e., the PCID). The PCID in one example is provisioned by a network operator of the wireless network 160. The base station selects (710) the SCID based on the PCID. The base station may use a many-to-one mapping between the SCID and the PCID. As one example, the base station selects the SCID such that the mobile device can determine:

PCID=Modulo(SCID,504).

In this case, SCIDs 0, 504, and 1008 map to PCID 0, while SCIDs 1, 505, and 1009 map to PCID 1, and SCIDs 503, 1007, and 1511 map to PCID 503. The base station broadcasts (715) the SCDS based on the SCID.

Figure 8:
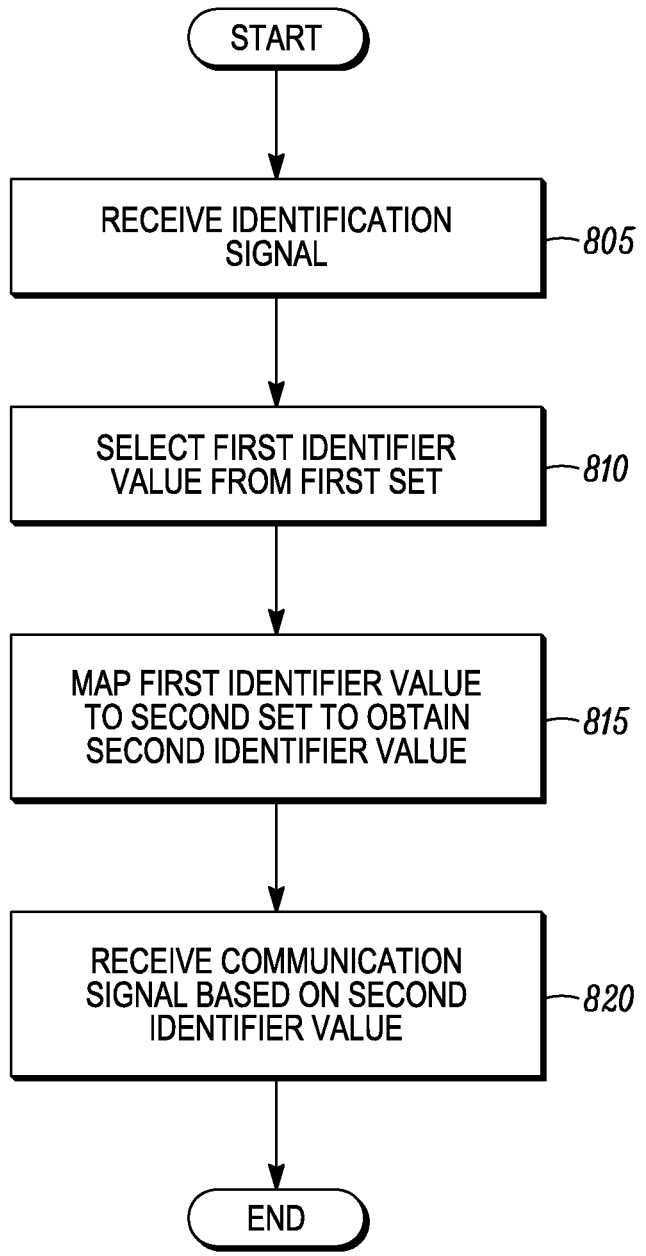
FIG. 8 is a flowchart of a method carried out by the base station of FIG. 1, according to an embodiment.

Turning to FIG. 8, a flowchart depicts one example of a method for the mobile device to determine the PCID of a cell based on a received SCID. The mobile device receives (805) an identification signal from the base station, such as the SCDS. The mobile device selects (810) a first identifier value from a first set of available identifiers, such as the set of available SCIDs. As described above, the mobile device determines the small-cell identifier (the first identifier) by hypothesizing various values of the SCID from the larger set of allowable values for the SCID and selects the SCID that meets a predetermined detection threshold. The mobile device maps (815) the first identifier to a set of available second identifiers, such as the set of available PCIDs using a many to one mapping. For example, the mobile device can map the first identifier as to the second identifier (PCID) as:

PCID=Modulo(SCID,504) where SCID is first identifier and PCID is second identifier. Thus, the mobile device determines the second identifier based on the first identifier.

The mobile device then receives (820) communications, such as the control channels, from the base station using the determined PCID or second identifier.

Figure 9:
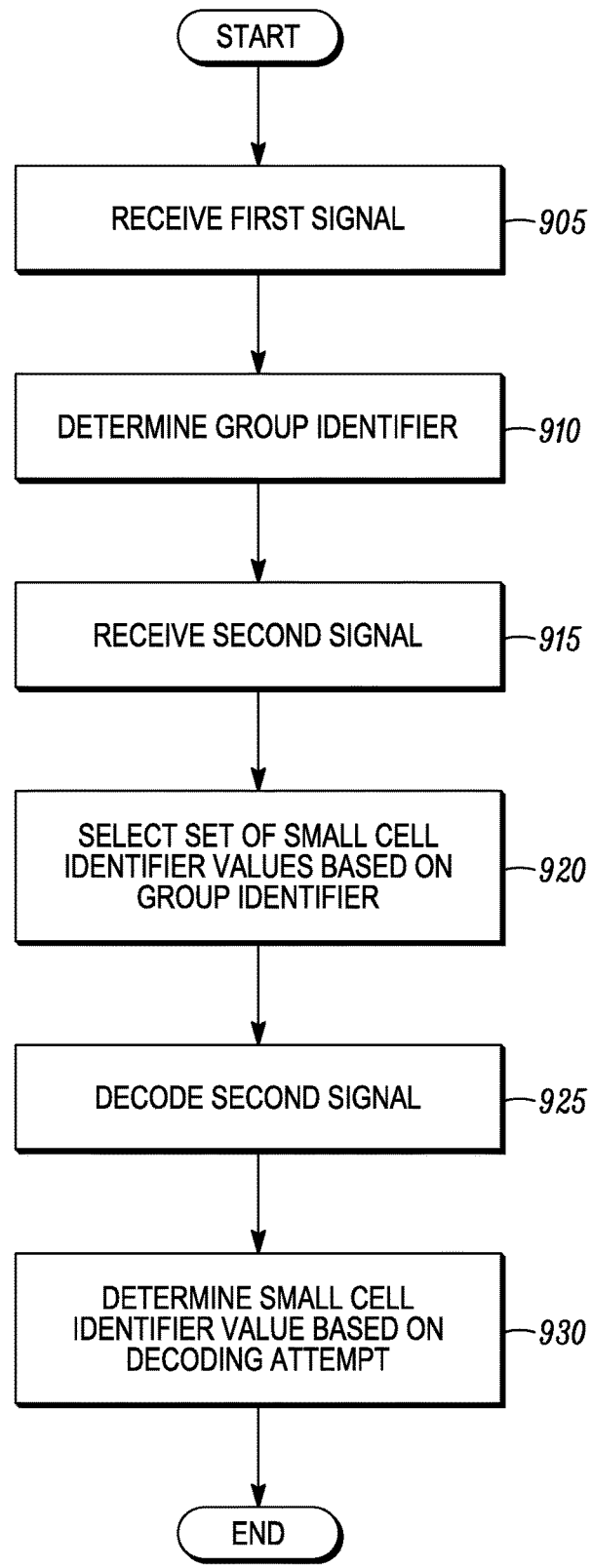
FIG. 9 is a flowchart of a method carried out by the mobile device of FIG. 1, according to an embodiment.

Turning to FIG. 9, a flowchart illustrates an example of a method for the mobile device to determine the SCID of a cell based on a received signal. This implementation can include PRS sequence initialization and $v_{shift}$ using the SCID instead of PCID. In LTE Release 11, the mobile device searches for 504 PCIDs in the absence of a neighbor cell list. On the other hand, providing a neighbor cell list can reduce the mobile device searching burden, but this requires significant operation and maintenance effort and the implementation of self-optimizing network and automatic neighbor relations functions. With the SCDS and SCIDs described herein, there can be more than 504 SCIDs, thus methods to reduce the mobile device search space can be beneficial. The base station and mobile device in one example use SCIDs that are organized into groups. This technique reduces search burden on the mobile device when hypothesizing the SCID. In one example, a total number of sequence identifiers, i.e., SCIDs, for SCDSs is an integer multiple of the number of available PCIDs (i.e., 504 K where K is an integer).

The network operator defines a small cell group identifier ("SGID") as:

SGID=Modulo(SCID,$G$).

In this case, $G$ is of the form:

$G=2^j 3^k 7^l$ where $j=0,1,\ldots,6; k=0,1,2,3$ and $l=0,1$.

The set of SCIDs are divided into G distinct groups with each of the distinct groups indexed by the SGID. For a number M=4032 of SCIDs and a number G=504 (e.g., where j=3, k=2, l=1), an SGID=0 corresponds to SCIDs {0, 504, 1008, 1512, 2016, 2520, 3024, 3528} while SGID=1 corresponds to SCIDs {1, 505, 1009, 1513, 2017, 2521, 3025, 3529). In this case, each group identified by an SGID contains (M/G) elements. For M=4032, there are M/G=8 SCIDs within each SGID group. The base station scrambles non-legacy signals, such as an enhanced physical downlink control channel, physical downlink shared channel, enhanced cell reference signal, or enhanced channel state information reference signals, based on a sequence that is a function of the SGID.

This results in the mobile device having to search for G=504 SGID groups instead of M=4032 SCIDs, which allows for a similar search complexity as in LTE Release 8. Scrambling and decoding of the non-legacy signals with the SGID by the base station and mobile device, respectively, are analogous to the scrambling and decoding of signals with the PCID, as will be apparent to those skilled in the art.

The mobile device receives (905) a non-legacy signal as a first signal. The first signal in one example is the SCDS. The mobile device determines (910) the group identifier SGID based on the first signal, for example, by performing one or more detection attempts as described above with reference to FIG. 5. Once the SGID is determined by the mobile device, the mobile device resolves the SCID to an element within the group of 8 SCIDs that corresponds to the detected SGID. The mobile device receives (915) a second signal from the base station. The mobile device selects (920) the set of SCIDs within the group of SCIDs that correspond to the detected SGID. The mobile device detects (925) the second signal based on the selected set of SCIDs and determines (930) the SCID based on the decoding attempt.

The mobile device in one example determines the SCID based on a random access channel response as the second signal from the small cell. In this case, the mobile device blindly descrambles the physical downlink control channel using hypothetical SCIDs that correspond to the detected SGID. In another example, the mobile device descrambles a dormant physical broadcast channel as the second signal using the hypothetical SCIDs that correspond to the detected SGID. In yet another example, the mobile device performs blind detection of pilot signals as the second signal, such as enhanced cell reference signals or enhanced channel state information reference signals, from the base station. In this case, the pilot signals are scrambled or initialized by a function of the SGID, in contrast to LTE Release 11, where the signals are scrambled or initialized by a function of PCID. If SCDS assistance information is provided by a serving cell (e.g., via the system information block, radio resource control information, etc.) to the mobile device, then the transmission bandwidth of the SCDS can be conveyed via the assistance information.

If the mobile device is expected to detect the SCDS without relying on assistance information signaling from another cell, then the mobile device can be required to perform blind decoding of SCDS. In such a case, to reduce blind decoding complexity, some simplifications may be possible, such as using a transmission bandwidth for SCDS of 1.4 MHz for a system bandwidth <=5 MHz and a transmission bandwidth of 5 MHz for SCDS for a system bandwidth >5 MHz. Alternately, if SCDS assistance information is provided by a serving cell (e.g., via SIB, radio resource control, etc.) to the mobile device, then the transmission bandwidth of the SCDS can be conveyed via the assistance information.

Figure 10:
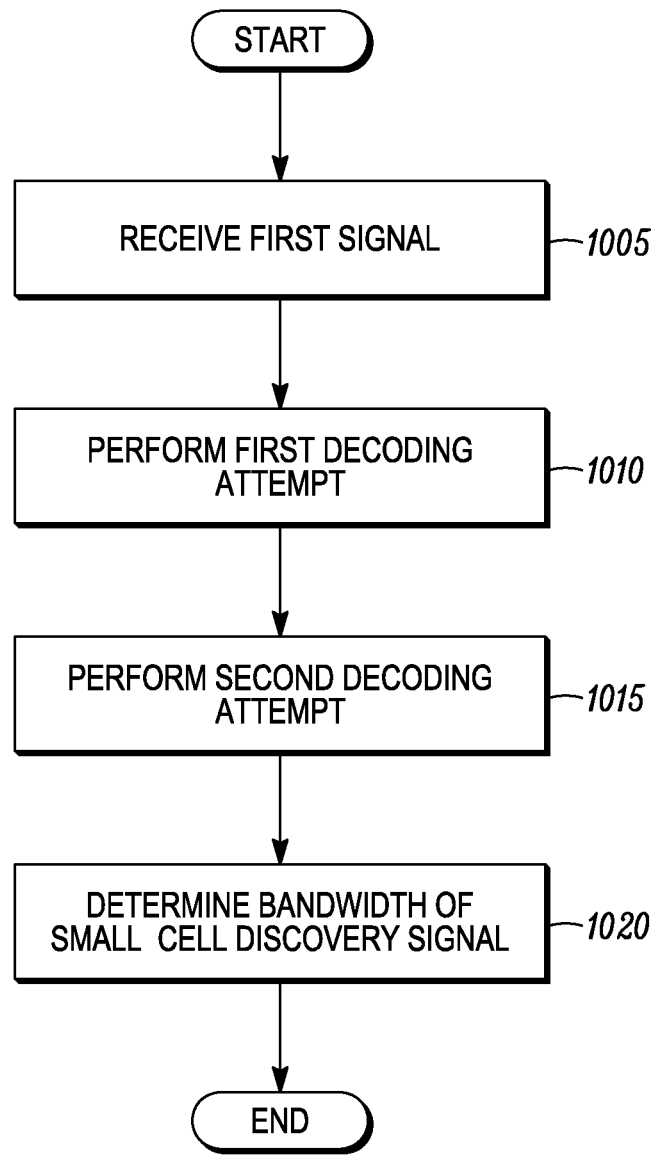
FIG. 10 is a flowchart of another method carried out by the mobile device of FIG. 1, according to an embodiment.

Turning to FIG. 10, a flowchart illustrates an example of a method for the mobile device to determine a system bandwidth for the base station. The base station in one example uses a bandwidth selected from a set of predetermined bandwidths (e.g., 1.4 MHz and 5 MHz) for transmission of the SCDS. The mobile device thus looks for both 1.4 MHz and 5 MHz SCDS sequences blindly, so for M=4032, the search space is 2*4032=8064. The base station can transmit a 5 MHz small signal discovery signal in two consecutive subframes once every $T_1$=200 milliseconds. The base station can transmit a 1.4 MHz SCDS in six consecutive subframes once every $T_1$=200 milliseconds. A sequence (for quadrature phase shift keying) and $V_{shift}$ can use the same mapping based on PCID as is the case for PRS. The frequency re-use and the length of the sequence (5 MHz+2 milliseconds or 1.4 MHz+6 milliseconds) is expected to provide superior detectability as compared to PSS and SSS or even cell reference signals, enabling the network operator to configure a large number of small cells within one or two carrier frequencies $f_1$ and $f_2$.

The mobile device scans for both the 1.4 MHz and 5 MHz SCDSs (e.g., the set of predetermined bandwidths) simultaneously (e.g., "one shot" cell detection). The mobile device receives (1005) a first signal from the base station during a predetermined buffer period that corresponds to the length of the sequence (e.g., 6 ms). The predetermined buffer period can be shorter if only the 5 MHz SCDS is present. The mobile device performs (1010) a first decoding attempt on the first signal using a first bandwidth (e.g., 1.4 MHz) from the set of predetermined bandwidths and also performs (1015) a second decoding attempt on the first signal using a second bandwidth (e.g., 5 MHz) from the set of predetermined bandwidths. The mobile device determines (1020)

which bandwidth is used for the SCDS, the 1.4 MHz or 5 MHz, based on whether the first or second decoding attempt is successful.

In one example, all small cells in a dormant state transmit the SCDS on just one or two carrier frequencies, such as the $f_1$ or $f_2$ frequencies in the 3.5 GHz band. The transmit occasions on each carrier are synchronized (e.g., using over the air network listening). The SCDS transmit occasions on carrier $f_1$ are on SFN index S1 and subframe n1, such that S1=Modulo(SFN, T1). The SCDS transmit occasions on carrier $f_2$ are on SFN index S2 and subframe n2, such that S2=Modulo (SFN, T2). In one example, T1=T2=200 milliseconds such that a mobile device served by a macro cell only needs to look at two carriers to detect dormant small cells. The macro cell can broadcast or indicate in a dedicated message the SCDS transmit schedule (e.g., offset (S1/S2) and periodicity (T1/T2)). In other examples, the macro cell schedules inter-frequency measurement gaps aligned with the transmit occasions if there is just one layer $f_1$.

In another embodiment, a mobile device (e.g., the mobile device 150) receives a signal from a cell (e.g., from the cell 131 via the base station 130). The signal can be the SCDS. The mobile device determines, based on the received signal, a first identifier value (e.g., a cell identifier or small-cell identifier value) belonging to a first set of values, such as the set of possible SCID values e.g., {0, 1, . . . , 4031}. The mobile device determines, from the first identifier value, a second identifier value, such as a physical-cell identifier or PCID value. The second identifier value belongs to a second set of values, such as a set of possible PCID values, i.e., {0, 1, . . . , 503}. The first set is larger than the second set. The mobile device determines the second identifier value based on a many to one mapping between the first set and the second set. The mobile device receives one or more physical channels or signals (e.g., PBCH, PCFICH, PDCCH, or CRS) from the cell using the second identifier value. The mobile device can receive the discovery signal when the cell is in a dormant state. The mobile device can receive the one or more physical channels when the cell is in an active state. The mobile device can determine the second identifier value from the first identifier value using the following many to one mapping rule: second identifier value=MOD (first identifier value, 504).

According to another embodiment, a mobile device performs the steps of: receiving a discovery signal (e.g., a cell-discovery signal) from a cell, attempting to detect a pilot sequence associated with the received signal by making a first hypothesis and at least a second hypothesis, determining that the cell is in active state if the attempt is successful by making the first hypothesis, and determining that the cell is in dormant state if the attempt is successful by making the second hypothesis.

The mobile device can also perform the steps of: assuming that the pilot sequence is generated using a cell identifier chosen from a first set of values, and assuming that the pilot sequence is generated using a cell identifier chosen from a second set of values.

The step of making the first hypothesis can further include: assuming that the pilot sequence is generated using a cell identifier chosen from a first set of values. The step of making the second hypothesis can further include: assuming that the pilot sequence is generated using an offset value added to the cell identifier chosen while making the first hypothesis.

The step of making the first hypothesis can further include assuming that the pilot sequence is generated using a first initialization state of a gold sequence generator. The step of making the second hypothesis can further include assuming that the pilot sequence is generated using a second initialization state of a gold sequence generator.

The first set can be distinct from the second set.

According to yet another embodiment, a mobile device performs the steps of: receiving a signal, such as a cell-discovery signal, decoding the received signal to detect a pilot sequence associated with an identifier of a cell, the pilot sequence corresponding to transmission of a discovery signal of the cell, determining the received signal contains the discovery signal of the cell based on the decoding attempt, and acquiring the energy saving state of the cell (e.g., a dormant or active state) based on the result of the detecting.

In another embodiment, a mobile device determines a cell group identifier and then determines a cell sequence identifier, such as a small cell sequence identifier ("SSID"). The mobile device performs the steps of: receiving a cell-discovery signal from a base station, receiving a second signal different from the cell-discovery signal, determining a group identifier of the base station from the cell-discovery signal, decoding the second signal based on a hypothesis on a SSID of the base station where the hypothesis is drawn from a set determined from the group identifier of the base station, and determining the SSID of the base station. The second signal can be one of a RACH response signal, a D-PBCH signal, a cell-specific reference signal scrambled or initialized with the SSID of the base station, or a channel state information reference signal scrambled or initialized with the SSID of the base station.

According to another embodiment, a mobile device performs "blind" detection of a bandwidth for a cell-discovery signal. The mobile device receives a cell-discovery signal on a first carrier frequency, which includes hypothesizing that the cell-discovery signal has at least one of a first bandwidth and a second bandwidth. The mobile device determines the bandwidth of the cell-discovery signal based on the received cell-discovery signal.

In another embodiment, a base station transmits messages in an active state and a dormant state. The base station transmits SI messages for a Public Land Mobile Network ("PLMN") in a plurality of SIBs when operating in an active state. The plurality of SIBs includes a SIB1 message. The base station periodically transmits the SIB1 with a first periodicity. The SIB1 includes a first value tag field that indicates if a change has occurred in SI messages for the PLMN. The first value tag field has a first value. The base station transmits a dormant-state message when operating in a dormant state. The base station periodically transmits the dormant-state message with a second periodicity that is longer than the first periodicity. The dormant-state message includes a second value tag field. The second value tag field has the first value if SI messages for the PLMN are unchanged. The second value tag field has a second value if SI messages for the PLMN are changed.

According to yet another embodiment, a mobile device performs the steps of: determining if a cell is operating in an active state or a dormant state, receiving paging messages from the cell in a first set of time domain occasions when the cell is operating in active state, receiving a discovery signal in a second set of time domain occasions when the cell is operating in dormant state, and receiving paging messages from the cell in a third set of time domain occasions when the cell is operating in dormant state. The mobile device determines the third set of time domain occasions from the second set of time domain occasions. At least one time domain occasion in the third set of time domain occasions is different from at least one time domain occasion in the first set of time domain occasions. The third set of time domain occasions and the second set of time domain occasions may occur in adjacent subframes. Alternate paging locations such as the third set of time domain resources can be next to a discovery signal location in order to help reduce power consumption by the mobile device, since it can receive both the paging message and discovery signal in one wake up interval. In other embodiments, the mobile device can transmit RACH preambles in alternate time domain locations when the cell is in the dormant state, analogous to receiving the paging messages in alternate time domain locations.

In another embodiment, a base station operates in at least one of an active state and a dormant state. The base station performs the steps of: transmitting a discovery signal associated with the base station identifier when operating in a dormant state and transmitting a first message when operating in the dormant state. The first message includes at least a value tag field associated with system-information messages and a field indicating that the base station is in a dormant state. The value tag field indicates a first value.

The base station can further perform the steps of: acquiring updated system-information messages, transmitting a second dormant-state message, the second message including at least a value tag field and a field indicating the base station is in a dormant state, the value tag field indicating a second value that is not same as the first value, and transmitting at least the updated system-information messages during the dormant state.

The base station can further perform the steps of: acquiring information to transition from the dormant state to active state and transmitting system-information messages during the active state. The system-information messages can include at least one message including a value tag field associated with the system-information messages. The value tag field can indicate the first value if the system-information messages are unchanged when transitioning from the dormant state to active state. The value tag field can indicate a second value if the system-information messages are changed when transitioning from the dormant state to active state.

The disclosed embodiments may be described in terms of functional block components and various processing steps. Such functional blocks may be realized by any number of hardware or software components configured to perform the specified functions.

It can be seen from the foregoing that methods and devices for communication between mobile devices and base stations with active and dormant states are provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:
1. A method in a mobile device for a long term evolution network, the method comprising:
    receiving an identification signal from a base station, wherein the identification signal identifies the base station;
    determining a group identifier for the base station based on the identification signal;
    receiving another signal, different from the identification signal, from the base station;
    selecting a set of cell identifier values that correspond to the group identifier determined for the base station based on the identification signal; and
    determining a cell identifier value of the base station from the selected set of cell identifier values based on at least one detection attempt of the another signal, wherein each detection attempt of the at least one detection attempt is based on a distinct value of the set of cell identifier values, wherein the cell identifier value corresponds to a successful detection attempt of the at least one detection attempt.

2. The method of claim 1 wherein the another signal is a random access channel response message.

3. The method of claim 1 wherein the another signal is a dormant physical broadcast channel signal.

4. The method of claim 1 wherein the another signal is a reference signal that is scrambled or initialized based on the cell identifier value.

5. The method of claim 1 wherein the group identifier G is of the form:

$$G=2^j3^k7^l, \text{ where } j=0,1,\ldots,6; k=0,1,2,3, \text{ and } l=0,1.$$

6. The method of claim 1 wherein determining the group identifier comprises performing at least one detection attempt on the identification signal with a plurality of group identifiers, wherein the identification signal is scrambled with the group identifier.

* * * * *